United States Patent Office 3,240,721
Patented Mar. 15, 1966

3,240,721
ALKYLENE OXIDE ADDUCTS OF POLYALKYLENE - POLYAMINE - EPIHALOHYDRIN CONDENSATION PRODUCTS
David B. Fordyce, Moorestown, N.J., assignor to Rohm & Haas Company, Philadelphia, Pa., a corporation of Delaware
No Drawing. Filed June 30, 1960, Ser. No. 39,819
4 Claims. (Cl. 260—2)

The present invention is concerned with reaction products of ethylene oxide with condensation products of an epihalohydrin and a poly(alkylene)polyamine of the formula $$NH_2((CH_2)_yNH)_x-H \qquad (I)$$

in which $x$ is a number having an average value from 2 to 6 including integral as well as mixed numbers and $y$ is an integer having a value of 4 to 8, and preferably 6.

The production of condensation products of polyethylenepolyamines with halohydrins is known. However, such products are generally of low molecular weight, relatively speaking, because of the difficulty of producing high molecular weight products of this type without encountering gelation. These low molecular weight condensation products have been proposed for use as flocculating agents and it is well known that the higher the molecular weight of the flocculating agent, the more efficient it generally is in its action. The difficulty with the known condensation products of this type has been that in trying to obtain high molecular weight products insoluble gels are obtained which are extremely difficult to handle. In fact, such condensation products are so readily gelled that they have formed the basis of anion-exchange resins as disclosed in U.S. Patents 2,469,683 and 2,469,692.

It has recently been found that condensation products which have high molecular weight, compared to the polyalkylenepolyamine epihalohydrin condensation products of the prior art, and which are still in soluble condition and are readily handled can be obtained by the condensation of an epihalohydrin with a poly(alkylene)polyamine of the formula hereinabove, such as poly(hexamethylene)polyamine. Preferably, the value of $x$ is from 2 to 4, but there may be used a mixture of poly(alkylene)polyamines in which the average value of $x$ may be as high as 6. In making these condensation products, there are reacted from about 0.20 to 0.40 gram-mole of epihalohydrin per 100 grams of the polyamine. Preferably, there is used from 0.25 to 0.3 gram-mole per 100 grams of the polyamine. These products are highly useful, for instance as flocculants for suspended insoluble matter, in aqueous media of acid, neutral, or only moderately alkaline character such as from a pH of about zero to about 10. However, they are generally insoluble in highly alkaline systems of a pH of about 14 to 9.5 or 10 so that their usefulness is correspondingly limited.

In accordance with the present invention, the epihalohydrinpolyamine condensates are reacted with ethylene oxide or propylene oxide in a amount to provide an average of about 0.5 to 1.5 moles of the oxide per amine nitrogen atom in the reaction product. Preferably, about 1.2 to 1.4 mole of oxide is introduced per nitrogen atom.

I. PREPARATION OF THE EPIHALOHYDRIN-POLYAMINE CONDENSATION PRODUCTS

The epihalohydrin used may be any of epichlorohydrin, epibromohydrin, epiiodohydrin, or mixtures thereof. Preferably, from the standpoint of cost, the epichlorohydrin is used.

The polyamine used may consist of di(tetramethylene) triamine, tri(tetramethylene)tetraamine, etc., di(pentamethylene)triamine, tri(pentamethylene)tetraamine, etc., corresponding poly(hexamethylene)polyamines, corresponding poly(heptamethylene)polyamines, and corresponding poly(octamethylene)polyamines. A pure simple compound of a mixture of compounds may be used For example, when the preferred poly(hexamethylene) polyamine is used, it may consist of di(hexamethylene) triamine, tri(hexamethylene)tetraamine, tetra(hexamethylene)pentaamine, penta(hexamethylene)hexaamine, hexa(hexamethylene)heptaamine, or mixtures thereof in the desired amounts. The starting polyamine may be of technical grade such as normally is available commercially which may contain a major proportion of one of such polyamines especially the di(hexamethylene)triamine with lesser amounts of the other polyamines mentioned.

The epihalohydrin and the polyamine of the formula hereinabove may be reacted in aqueous media. Thus, the amine may be dissolved in water to provide a solution which may have a concentration from 5% up to saturation, concentration of the order of 50% by weight being entirely practical. A large proportion of the total amount of epihalohydrin to be used in the reaction is gradually added while the solution of the amine is maintained at a temperature of about 60° to 85° C. or higher. Preferably, the temperature is in the neighborhood of 70° to 80° C. After starting the addition of the epihalohydrin, caustic soda or causic potash is added in a proportion such as to take up the hydrogen halide liberated by the reaction. This amounts to one mole of caustic per mole of epihalohydrin added. Since epihalohydrin tends to be destroyed by the caustic, it is essential that the addition of the caustic be so controlled that the epihalohydrin has an opportunity to mix with the polyamine and react therewith before substantial amounts of caustic are added. In effect, the addition of the caustic shortly after the mixing of the epihalohydrin into the polyamine results in favoring the reaction of liberated hydrogen halide with the caustic thereby preventing the latter from destroying the epihalohydrin. In this preliminary stage in which most of the epihalohydrin is added, the proportion amounts to about 70 to 90% by weight of the total amount of epihalohydrin to be used. Upon the completion of the addition of this first major proportion of the epihalohydrin and the molar equivalent amount of caustic, the pH is adjusted to a value of about 9.0 to 9.5 with sulfuric acid and at this point the remainder of the epihalohydrin along with the molar equivalent amount of the caustic is added, the addition being controlled to body the mixture to a viscosity between about 6 and 11 poises or between about U and W, Gardner-Holdt, at a concentration of 25% solids and at room temperature (25° C.). When the viscosity has attained this point, the condensation product is essentially completed and the reaction is effectively terminated by cooling the batch to room temperature. The pH may also be adjusted to about 5.5 to 7.0 by the addition of sulfuric acid, but this may or may not be necessary. The neutralized or acidified product thereby obtained may be filtered to improve its clarity.

It is sometimes advantageous, before reacting the epihalohydrin/polyamine reaction product with the alkylene oxide, to subject the reaction product to a reducing agent or bleaching agent such as sodium formaldehyde sulfoxylate, sodium sulfite, or other alkali metal bisulfite, metabisulfite, or hydrosulfite, particularly when commercial polyamine mixtures are employed as the starting material. The amount of the reducing agent may vary depending upon the particular reaction mixture. It may be from about ½% to as much as 5% by weight, based on the weight of the condensation product. A preferred proportion is about 3 to 4% by weight. The bleaching agent may simply be added as stated to the aqueous solution of the condensation product after it has been adjusted to a pH of about 5.5 to 7.0. Then the mixture is heated for a period of up to 1 to 2 hours at about 45° to 90° C., preferably about 50° to 60° C. This treatment renders the product lighter in color and removes by-products which are sometimes present and tend to cause gelation on standing. After the treatment with the bleaching agent, the reaction mass is filtered to remove any sediment. The product obtained is improved in color, clarity, and it has less tendency to deposit a sediment on standing. The product thereby obtained is greatly improved in stability on storage, especially at and above 25% concentrations at and above room temperature.

Hereinafter, the expression "resin solids" refers to the weight of the condensation product in free amine form; "total solids" includes inorganic components as well, such as the amount of sodium chloride and sulfuric acid combined with the condensate in salt form.

II. PREPARATION OF ADDUCTS OF ETHYLENE OXIDE OR PROPYLENE OXIDE

The epihalohydrin-polyamine condensation product obtained in the manner described above is adjusted to a pH of about 6 to 7 and a temperature of 45° to 85° C. The ($C_2$–$C_3$)-alkylene oxide is then added in an amount of about 20 to 150% by weight of the condensation product while the temperature is maintained in the range stated, preferably about 70° C. The oxide may be added in the form of a gas or a liquid under pressure. During the reaction, the viscosity of the product generally increases somewhat, its pH rises, and the product becomes soluble in highly alkaline systems even up to a pH of about 14. Ethylene oxide is generally preferred because it gives a product of much better solubility and of greater efficiency in the strongly alkaline media. A mixture of ethylene oxide and propylene oxide may also be used.

In the oxide adduct thus obtained, the hydroxyalkyl groups introduced are believed in most instances to replace hydrogen atoms on any primary or secondary amino nitrogen atoms. Possibly in some instances, a part of the oxide adds to tertiary amino nitrogen atoms to form quaternary ammonium groups. It is to be understood, however, that the invention is not to be limited by such theoretical conjectures since the products obtained are of quite complex nature.

The alkylene oxide condensation product may then be treated with any of the reducing agents mentioned hereinabove in the same way as the epihalohydrin/polyamine reaction product described above.

The alkylene oxide adducts or reaction products obtained in accordance with the present invention find numerous uses including use as flocculating agents for improving the filterability and separation by sedimentation and decantation of aqueous liquors containing finely divided particles suspended therein. They may be employed for this purpose at any pH from an extremely acid condition of about one or less up to about a pH of about 14 throughout the range wherein the condensation product remains soluble in water. The amount of flocculating agent used may be from 0.001 to 5% by weight, based on the weight of suspended matter, in the suspension.

These flocculating aids may be employed and are highly efficient throughout the pH range stated for the treatment of suspensions containing both inorganic and organic matters or mixtures thereof. Examples include sewages, cannery wastes, suspensions of either acid, neutral, or alkaline character within the pH range stated which are obtained as a result of either alkaline or acid leaching of ores, suspensions obtained in the form of natural waters containing silt and all sorts of other waste liquors obtained as a result of industrial or sanitary operations. They may also be used alone or in conjunction with alum or ferric chloride for clarification of muddy or turbid natural waters.

Related uses are those concerned with the recovery or treatment of clays, the preparation of pigments, including the dispersion thereof in pigment pastes or pigment-printing and dyeing compositions, in the production of paper and textile materials. In the production of paper, they may be employed to enhance the deposition of mineral fillers such as clay on the paper pulp and to maintain the white water is essentially clear condition. In the formation of papers, they may also be employed as an adjunct to alum or in place of it.

The reaction products of the present invention are also useful for the imparting of wet-strength to papers. For this purpose, they may be introduced into the paper either in the beater or in the size box after partial drying of the paper and the amount employed may be from about 0.1 to 5% or more by weight, based on the dry weight of fibers making up the paper.

The reaction products are useful as stated for dispersing pigments and also for the dispersing of pesticidal agents such as insecticides, fungicides, and acaricides, especially in aqueous media. For this purpose as in the case of the dispersion of pigments, the proportion of the condensation product employed may be from about 0.1 to 4% by weight, based on the weight of the material to be dispersed.

The products of the present invention are characterized by outstanding efficiency, particularly in their use as flocculating agents, as compared to prior known polyamine epihalohydrin condensation products. Based on their relative cost, the products of the present invention generally have three times the efficiency of analogous condensation products of epihalohydrin and diethylenetriamine. The products of the present invention, as stated previously, are characterized by comparatively high molecular weight. The viscosity of the condensation products in aqueous solutions of a given concentration, such as about 25% by weight, may be as high as 10 times that of a corresponding aqueous solution of known condensation products of epihalohydrin with diethylenetriamine.

In the examples hereinafter which are illustrative of the present invention, the parts and percentages are by weight unless otherwise indicated.

Example 1

(a) To 674 grams of a technical grade of a poly(hexamethylene)polyamine of Formula I in which the average value of $x$ is about 2.7 containing about 50% by weight of bis(hexamethylene)triamine, about 35% of higher molecular weight polyamines of the formula in which $x$ is 3, or higher, and about 10% of a mixture of hexamethylenediamine, adiponitrile, ε-aminocapronitrile, and 2-cyanocyclopentylidenimine was added 721 grams of water, and the mixture was heated to 75° C. 135 grams of epichlorohydrin was added, dropwise, with good stirring. The addition of 117 grams of 50% sodium hydroxide was begun after the addition of about 70% of the epichlorohydrin was completed. The additions were then effected simultaneously at such a rate that 50% of the caustic remained to be added after complete addition of the epichlorohydrin. After completion of the addition of caustic, 759 gm. of a 25% sulfuric acid solution was added. The viscosity was 1.4 poises and the pH was 9.7.

Incremental additions of epichlorohydrin and the corresponding equivalents of 50% sodium hydroxide solution were made to 1191 grams of the above solution until the viscosity reached about 20 poises. This required 13.3 grams of epichlorohydrin, 8.5 grams of 50% sodium hydroxide, 134 grams of 25% $H_2SO_4$ and 85 grams of water. After complete addition of the caustic, 100 grams of a 25% sulfuric acid solution was added. This was followed by 11.5 grams of sodium hydrosulfite, and the resulting solution was heated for two hours at 60° C. The 24.8% resin solids solution had a viscosity of 11.0 poises and a pH of 6.5.

(b) To 267 grams of the aqueous resin solution containing 24.8% resin obtained in part (a) hereof there was added 39 grams of ethylene oxide by evaporation into a closed system equipped with a fast stirrer. Addition time was seven hours, the pressure was 0 to 15 cm. of mercury above atmospheric pressure, and the temperature was 65 to 70° C. The reaction was completed when all of the ethylene oxide was consumed and a negative pressure was maintained in the system at 70° C. or higher. At this point, there was added 85 grams of water and 30 grams of a 25% solution of sulfuric acid to bring the resin solids to 25% with a pH=7.7.

Viscosities of the 25% solution and a solution diluted to 15% were about 4.0 poises and 0.85 poise, respectively, Total solids found on a 15% resin solution: 21.1%; calculated 21.2%.

Example 2

(a) To 200 grams of di(hexamethylene)triamine, there was added 214 grams of water. The mixture was stirred at 75° C. during the addition of 72 grams of epichlorohydrin. Simultaneously, there was added 56 grams of a 50% sodium hydroxide solution which was begun after about 75% of the 72 grams of epichlorohydrin was added and was 60% completed upon completion of the epichlorohydrin. When the addition of the caustic was completed, there was added 394 grams of a 25% solution of sulfuric acid. The viscosity was about 3 poises and the pH 9.0.

(b) To 497 grams of the 24.9% resin solids solution of part (a) there was added 85.5 grams of ethylene oxide over a five-hour period in a closed system maintained at about 75° C. When no pressure was evident upon further heating of the closed system and all of the ethylene oxide was consumed, 207 grams of water was added with 30.0 grams of a 25% sulfuric acid solution. At 25° C., 5 grams of sodium hydrosulfite was added, and the solution was heated at 60° C. for 1¼ hours.

The 25.1% resin solution had a viscosity of 1.6 and 0.55 poise at 15%; pH 7.5.

Total solids found for a 15% resin solution: 20.9%.
Total solids calculated for a 15% resin solution: 20.4%.

Example 3

(a) To a mixture of 100 grams of the same technical grade of poly(hexamethylene)polyamine as was used in Example 1 (a) and 100 grams of bis(hexamethylene)triamine in 214 grams of water was added simultaneously 40 grams of epichlorohydrin and 34.5 grams of a 50% solution of sodium hydroxide. The additions were done in such a manner that about one-third of the caustic remained to be added when all of the epichlorohydrin was consumed. Upon complete addition of the caustic, there was added 225 grams of a 25% $H_2SO_4$ solution. Increment additions of epichlorohydrin and 50% NaOH were made from time to time followed by addition of 25% $H_2SO_4$ to keep the pH below 10. When the viscosity reached 10 poises, the above process was stopped. The amount of epichlorohydrin, caustic, and 25% $H_2SO_4$ used amounted to 13.6 grams, 5.7 grams, and 141.0 grams respectively. A 25% resin solution of the above resin had a viscosity of about 10 poises and a pH of 7.8.

To 550.5 grams of the above solution was added 4.1 grams of sodium hydrosulfite, and the solution was heated for 1¼ hours at 75–80° C. The solution was brought down to 23.7% resin by the addition of 25% $H_2SO_4$ solution. The viscosity and pH were found to be about 9 poises and 6.9 respectively.

(b) To 497 grams of the 24.9% resin solids solution of part (a) there was added 85.5 grams of ethylene oxide over a five-hour period in a closed system maintained at about 75° C. When no pressure was evident upon further heating of the closed system and all of the ethylene oxide was consumed, 207 grams of water was added with 30.0 grams of a 25% sulfuric acid solution. At 25° C., 5 grams of sodium hydrosulfite was added, and the solution was heated at 60° C. for 1¼ hours.

Example 4

To 500 grams of the aqueous resin solution containing 22.7% resin obtained in Example 2 (a), there was added in sequence 60 grams of propylene oxide and 50 grams of ethylene oxide over a period of 5 hours at a temperature of 70° to 75° C. and a pressure of about 5 to 10 cm. of mercury above atmospheric pressure. After completion of the reaction, water and 25% sulfuric acid were added to bring the concentration to 25% solids and the pH to about 7.5. Then there was added 7 grams of sodium formaldehyde sulfoxylate and the solution was heated one hour at 60° C., and finally filtered.

Example 5.—Improvement in filtration

A suspension in water was prepared containing 10 grams of clay (kaolin) per 100 ml. and having a pH of 12. This suspension required 930 seconds to filter 100 ml. By adding 0.1%, based on the weight of clay, of the condensate obtained in Example 1 (b) to the suspension, the filtration time was reduced to 174 seconds.

The products of Examples 2 (b), 3 and 4 also provide markedly reduced filtration times.

Example 6

(a) To 300 grams of the same technical grade of poly(hexamethylene)polyamine as was used in Example 1 (a), there was added 321 grams of water. The mixture was stirred at 75° C. during the addition of 60 grams of epichlorohydrin. Simultaneously there was added 52 grams of a 50% sodium hydroxide solution which was begun after about 75% of the 60 grams of epichlorohydrin was added. About 38% of the caustic charge remained to be added upon completion of the epichlorohydrin addition. When the addition of the caustic was completed, there was added 338 grams of a 25% solution of sulfuric acid. The viscosity was about 1.1 poises and the pH 9.7.

Incremental additions of 9.1 grams of epichlorohydrin and 8.5 grams of a 50% sodium hydroxide were made from time to time until the viscosity reached 9.0 poises. 87 grams of water and 205 grams of a 25% solution of sulfuric acid were added to bring the resin solids to 24.7% and the pH 5.8. At this point, the viscosities were about 5.0 poises, and at 15% resin solids 0.85 poise.

Total solids found for a 15% resin solution: 22.8%; calculated, 22.8%.

(b) To 605.5 grams of the 24.7% resin solids solution of part (a), there was added 108 grams of ethylene oxide over a five-hour period in a closed system maintained at about 75° C. When no pressure was evident upon further heating of the closed system and all the ethylene oxide was consumed, the solution had a viscosity of about 8.0 poise and a pH of 9.0. To 182 grams of the above solution, 2.0 grams of sodium hydrosulfite was added, and the solution was heated at 60° C. for 1¼ hours.

The 35.7% resin solution had a viscosity of about 23 poises, and 0.65 poise at 15% resin solids.

Total solids found for a 15% resin solution: 19.3%; calculated 19.9%.

Example 7

To 333 grams of an aqueous resin solution obtained as in Example 6 (a), but containing 24.9% resin solids, there was added 71 grams of propylene oxide over a three-hour period in a closed system maintained at about 70° C. When no pressure was evident upon further heating of the closed system and all of the propylene oxide was consumed, 54 grams of water was added with 50 grams of 25% sulfuric acid solution. At 25° C., 4.6 grams of sodium hydrosulfite was added, and the solution was heated at 60° C. for one hour.

The 30% resin solid solution had a viscosity of about 2.0 poises, and 0.32 poise at 15% resin solids.

Example 8.—Water clarification

The optimum level of 25 p.p.m. of alum was added to a natural turbid water obtained from the Delaware River which contained 325 p.p.m. of turbidity. This mixture was stirred for 5 minutes at 100 r.p.m. and then reduced to 30 r.p.m. for 15 minutes. Upon stopping the stirring, the suspension was allowed to settle and aliquots of the supernatant were removed after 0.5 min. and 15 min. settling times. The resultant turbidities were 190 p.p.m. after 0.5 min. and 6.6 after 15 min. With the addition of a 0.5 p.p.m. of the condensate of Example 1 (b) to the above treatment, the turbidity was reduced to 21 p.p.m. after 0.5 min. settling time. When 15 p.p.m. of a bentonite clay is added in conjunction with 25 p.p.m. of alum and 0.5 p.p.m. of the condensate from Example 1 (b), the turbidity was reduced to 28.5 p.p.m. for 0.5 min. settling time and for 15 min. settling time, 3.7 p.p.m.

Example 9.—Water clarification

Using the procedure of Example 8, 20 p.p.m. of alum were added to a natural turbid Delaware River water containing 68 p.p.m. of turbidity. The resultant 0.5 min. and 15 min turbidities were 58 p.p.m. and 3.9 p.p.m. When 0.5 p.p.m. of the condensate of Example 1 (b) were added in conjunction with 20 p.p.m. of alum, the turbidity was reduced to 22 p.p.m., for the 0.5 min. settling time. Upon the addition of 15 p.p.m. of a bentonite clay with 20 p.p.m. of alum and 0.5 p.p.m of the condensate of Example 1 (b), the 0.5 min. turbidity was 12.5 p.p.m., and after 15 min. the turbidity was 2.6 p.p.m.

Example 10.—Water clarification 30 p.p.m. of alum were added to a natural turbid water from the Delaware River containing 110 p.p.m. of turbidity. The resultant 0.5 min. and 15 min. turbidities were 100 p.p.m. and 2.6 p.p.m. When 0.5 p.p.m. of the condensate in Example 7 was added in conjunction with 30 p.p.m. of alum, the turbidity at 0.5 min. was reduced to 50 p.p.m. Upon the addition of 15 p.p.m. of a bentonite clay in conjunction with 30 p.p.m. of alum and 0.5 p.p.m. of the condensate in Example 7, the turbidities were reduced to 33.5 p.p.m. for 0.5 min. settling time and 1.5 p.p.m. for 15 min. settling time.

The condensate of Example 3 (b) gives similar results.

Example 11.—Improvement in filtration

An aqueous suspension was prepared containing 10 grams of clay (kaolin) in 100 ml. and having a pH of 12. This suspension required 930 seconds to filter 100 ml. By adding 0.1% based on the weight of clay of the condensates obtained in Examples 1 (b), 6 (b), and 7, the filtration times were reduced to 174 seconds, 202 seconds and 281 seconds, respectively.

I claim:

1. As a composition of matter, a reaction product obtained by reaction at a pH of about 6 to 7 and a temperature of 45 to 85° C. of an alkylene oxide selected from the group consisting of ethylene oxide and propylene oxide with a condensation product resulting from the condensation at a temperature of about 60 to 85° C. of epichlorohydrin with a poly(alkylene)polyamine of the formula $$NH_2((CH_2)_yNH)_x-H$$

in which $x$ is a number having an average value of 2 to 6, and $y$ is an integer having a value of 4 to 8, the epichlorohydrin being used in a proportion of 0.20 to 0.40 gram-mole thereof per 100 grams of the polyamine, the condensation product having been obtained by gradual addition of the epichlorohydrin to the polyamine dissolved in water and maintained at a temperature of at least about 60° C. and the gradual addition of about a mole of an alkali metal hydroxide for each mole of epichlorohydrin added, adjustment to a pH of about 9.0 to 9.5 upon completion of the addition of about 70 to 90% by weight of the total amount of epichlorohydrin, and by maintaining the condensation product mixture at a temperature of at least 60° C. until the mixture attains a viscosity between about 6 and 11 poises at a concentration of 25% solids at room temperature, said reaction product being water-soluble in media having a pH from about zero to about 14, the proportion of alkylene oxide being from about 0.5 to 1.5 moles per amino nitrogen atom in the condensation product.

2. As a composition of matter, a reaction product obtained by reaction at a pH of about 6 to 7 and a temperature of 45 to 85° C. of ethylene oxide with a condensation product resulting from the condensation at a temperature of about 60 to 85° C., of epichlorohydrin with a poly(alkylene)polyamine of the formula $$NH_2((CH_2)_yNH)_x-H$$

in which $x$ is a number having an average value of 2 to 6, and $y$ is an integer having a value of 4 to 8, the epichlorohydrin being used in a proportion of 0.20 to 0.40 gram-mole thereof per 100 grams of the polyamine, the condensation product having been obtained by gradual addition of the epichlorohydrin to the polyamine dissolved in water and maintained at a temperature of at least about 60° C. and by the gradual addition of about a mole of an alkali metal hydroxide for each mole of epichlorohydrin added, adjustment to a pH of about 9.0 to 9.5 upon completion of the addition of about 70 to 90% by weight of the total amount of epichlorohydrin, and by maintaining the condensation product mixture at a temperature of at least 60° C. until the mixture attains a viscosity between about 6 and 11 poises at a concentration of 25% solids at room temperature, said reaction product being water-soluble in media having a pH from about zero to about 14, the proportion of ethylene oxide being from about 0.5 to 1.5 moles per amino nitrogen atom in the condensation product.

3. As a composition of matter, a reaction product obtained by reaction at a pH of about 6 to 7 and a temperature of 45 to 85° C. of ethylene oxide with a condensation product resulting from the condensation at a temperature of about 60 to 85° C. of epichlorohydrin with a poly(hexamethylene)polyamine of the formula $$NH_2((CH_2)_6NH)_x-H$$

in which $x$ has a value of 2 to 4, the epichlorohydrin being used in a proportion of 0.20 to 0.40 gram-mole thereof per 100 grams of the polyamine, the condensation product having been obtained by gradual addition of the epichlorohydrin to the polyamine dissolved in water and maintained at a temperature of at least about 60° C. and by the gradual addition of about a mole of an alkali metal hydroxide for each mole of epichlorohydrin added, adjustment to a pH of about 9.0 to 9.5 upon completion of the addition of about 70 to 90% by weight of the total amount of epichlorohydrin, and by maintaining the condensation product mixture at a temperature of at least 60° C. until the mixture attains a viscosity between about 6 and 11 poises at a concentration of 25% solids at room temperature, said reaction product being water-soluble in media having a pH from about zero to about 14, the proportion of ethylene oxide being from about 0.5 to 1.5 moles per amino nitrogen atom in the condensation product.

4. As a composition of matter, a reaction product obtained by reaction at a pH of about 6 to 7 and a temperature of 45 to 85° C. of ethylene oxide with a condensation product resulting from the condensation at a temperature of about 60 to 85° C. of epichlorohydrin with a mixture of poly(hexamethylene)polyamines of the formula $$NH_2((CH_2)_6NH)_x-H$$

where $x$ has an average value of at least 2 up to about 4, the epichlorohydrin being used in a proportion of 0.20 to 0.40 gram-mole thereof per 100 grams of the polyamine, the condensation product having been obtained by gradual addition of the epichlorohydrin to the polyamine dissolved in water and maintained at a temperature of at least about 60° C. and by the gradual addition of about a mole of an alkali metal hydroxide for each mole of epichlorohydrin added, adjustment to a pH of about 9.0 to 9.5 upon completion of the addition of about 70 to 90% by weight of the total amount of epichlorohydrin, and by maintaining the condensation product mixture at a temperature of at least 60° C. until the mixture attains a viscosity between about 6 and 11 poises at a concentration of 25% solids at room temperature, the proportion of ethylene oxide being from about 0.5 to 1.5 moles per amino nitrogen atom in the condensation product.

References Cited by the Examiner

UNITED STATES PATENTS

| | | | |
|---|---|---|---|
| 2,174,762 | 10/1939 | Schuette et al. | 260—2 |
| 2,724,694 | 11/1955 | Troianello | 252—8.8 |
| 2,742,453 | 4/1956 | Auten | 260—77.5 |
| 2,765,228 | 10/1956 | Jordan | 92—3 |
| 2,864,775 | 12/1958 | Newey | 260—2 |

FOREIGN PATENTS 628,821    9/1949    Great Britain.

OTHER REFERENCES

Chemical Abstracts, vol. 52 (1958), p. 18316a (reference therein to Swiss Patents 325,734 and 325,735 issued to O. Albrecht in November 1957).

WILLIAM H. SHORT, *Primary Examiner.*

PHILIP E. MANGAN, JOSEPH R. LIBERMAN,
*Examiners.*